(12) United States Patent
Stevenson

(10) Patent No.: US 6,684,993 B2
(45) Date of Patent: Feb. 3, 2004

(54) APPARATUS FOR CONTROLLING A CLUTCH IN AN AUTOMATIC VEHICLE TRANSMISSION

(75) Inventor: Paul Dwight Stevenson, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/147,548

(22) Filed: May 16, 2002

(65) Prior Publication Data

US 2003/0213668 A1 Nov. 20, 2003

(51) Int. Cl.[7] .............................................. F16D 27/08
(52) U.S. Cl. ....................................... 192/48.2; 192/94
(58) Field of Search .............................. 192/48.2, 52.1, 192/110 R, 94

(56) References Cited

U.S. PATENT DOCUMENTS

| | | | |
|---|---|---|---|
| 4,715,482 A | 12/1987 | Watanabe et al. | 192/0.032 |
| 4,734,861 A | 3/1988 | Bertolasi et al. | 364/424.1 |
| 4,986,401 A | 1/1991 | Petzold et al. | 192/0.032 |
| 5,024,638 A * | 6/1991 | Sakakibara et al. | 475/210 |
| RE33,713 E | 10/1991 | Watanabe et al. | 192/0.032 |
| 5,199,325 A | 4/1993 | Reuter et al. | 74/861 |
| 5,507,373 A | 4/1996 | Nguyen | 192/3.58 |

* cited by examiner

Primary Examiner—Saul Rodriguez
(74) Attorney, Agent, or Firm—Leslie C. Hodges

(57) ABSTRACT

An apparatus for controlling the clutches in an automatic vehicle transmission includes a series of electric motors attached to the transmission housing, each of which has a motor shaft with a gear attached to it. A torque-to-thrust mechanism is driven by the driving gear and includes a thrust element that imparts a linear force to the apply plate of a clutch. Also included is a sensing system that allows for sensitive control of the torque-to-thrust mechanism which facilitates smooth engagement and disengagement of the clutch.

16 Claims, 3 Drawing Sheets

APPARATUS FOR CONTROLLING A CLUTCH IN AN AUTOMATIC VEHICLE TRANSMISSION

TECHNICAL FIELD

The present invention relates to an apparatus for controlling a clutch using an electric motor and a torque-to-thrust mechanism.

BACKGROUND OF THE INVENTION

Automatic transmissions have long been used in vehicles as a convenient substitute for manual transmissions. Today automatic transmissions are by far the most popular option for the majority of the driving public. Having an automatic transmission in a vehicle eliminates the need for a driver to master the skilled operation of manual gear shifting. Elimination of this operation, though beneficial in some respects, does come at a cost: decreased vehicle efficiency.

One of the inefficiencies of an automatic transmission is the high-pressure pump. The high-pressure pump produces the transmission fluid (oil) pressure, and thereby serves a number of important roles. First, the high oil pressure is required to maintain torque converter charge pressure, which is the torque converter oil inlet pressure at the centerline of the transmission. It is necessary to maintain this pressure to avoid cavitation, which is not only inefficient, but can be damaging. The high-pressure pump also supplies the fluid pressure necessary to selectively apply the clutches that provide the desired gear ratios. The control of the clutches also requires a complex system of solenoids, valves, shaft seals, centrifugal clutch balance, and oil routing to ensure that oil at the proper pressure is received by each clutch when it is applied, and that the oil is properly exhausted when each clutch is released.

Accordingly, it is desirable to provide an apparatus for engaging the clutches in an automatic transmission that eliminates the need for the high-pressure pump, the solenoids and the valve body, thereby increasing the vehicle efficiency and decreasing its mass and size, while still maintaining the benefits associated with having an automatic transmission.

SUMMARY OF THE INVENTION

The present invention provides an apparatus for applying clutches in an automatic transmission that eliminates the need for a high-pressure pump, solenoids, and a valve body. The transmission fluid is normally pressurized by the pump and controlled by solenoids and valves in the valve body. The solenoids regulate and direct the flow of the fluid through the valves, thereby controlling pistons that apply clutches. In the present invention, this system is replaced by a series of electric motors and torque-to-thrust mechanisms which work together to control the clutches. The motors are conveniently mounted on the bottom of the transmission and have motor shafts that enter the transmission through the transmission housing. A driving element such as a worm gear, spur gear or bevel gear is attached to each motor shaft, and drives a torque-to-thrust mechanism. The choice of the drive element is primarily dictated by the required speed ratios between the motor and the torque-to-thrust mechanism, and by the motor shaft orientation which is optimized for packaging. The driving element attached to each motor shaft causes rotation of a drive wheel in the torque-to-thrust mechanism. It is worth noting that the driving element can also be a sprocket, in which case a chain connects the sprocket with the drive wheel. The center of the drive wheel is located on the center line of the transmission, and it is piloted on the transmission case by a bushing or bearing as it rotates around the transmission center line.

There are many potential torque-to-thrust mechanisms that can be used to perform the role of transforming the motor torque into a linear thrust force. In one version, one end of a coil spring is affixed to the drive wheel such that rotation of the drive wheel causes rotation of the spring. The coils of the spring are fed through a small aperture in an apply ring, such that at least a portion of the coils are disposed on each side of the apply ring. The apply ring is rotationally constrained by splines in the transmission housing. As the drive wheel and spring rotate, the spring wire is transferred from one side of the apply ring to the other, resulting in the number of coils on one side of the apply ring decreasing. This causes the apply ring to move linearly in the direction of the decreasing coils. Continued rotation of the drive wheel and coil spring in this direction causes the apply ring to contact an apply plate. At this point, the torque on the drive wheel increases, which results in a thrust load on the apply plate and the subsequent application of the clutch. Rotation of the drive wheel and the coil spring in the opposite direction moves the apply ring away from the apply plate, thereby disengaging the clutch.

There are several methods by which the application of the clutch is controlled. Primary among these are control of the motor torque and control of the apply plate position. In the latter example, a position spring is used to convert position into a thrust. Because the deflection of the spring is related to the position of the apply plate, the thrust, or clamp load, is easily determined through measurement of the motor rotation. Utilizing torque control to ensure smooth application of the clutch requires control of the torque of the drive motor, since this in turn controls the thrust of the apply ring to the apply plate. To accomplish this motor control, an ammeter is used to monitor the current load on the drive motor, and an encoder is used to measure the motor's rotational position.

When the apply ring is not contacting the apply plate, there is very little motor torque and the motor is rotated utilizing any of the well known motor speed control systems. As the apply ring exerts a force on the apply plate, the motor torque increases, the ammeter detects an increase in the current load, and the motor is then rotated utilizing any of the well known motor torque control systems. The processor used to control the various elements within the transmission, including the present invention, is a transmission control module. Although transmission control modules are currently used in automatic transmissions, they have a relatively low current draw because their primary function is to control the solenoids in the valve body. The transmission control module utilized in the present invention is a modification of the standard module in that it is designed to handle a higher current load necessitated by its new function: operating the electric drive motors.

Another spring may be included in the torque-to-thrust mechanism to increase the mechanism's compliance such that the transmission control module can control the drive motor with the requisite level of sensitivity. A separate motor is used for each clutch, even in a six speed transmission. In addition to these drive motors, an extra motor can be mounted on the bottom of the transmission housing to pump a small volume of low pressure fluid through the transmission, thereby cooling and lubricating the moving components.

Accordingly, one aspect of the present invention provides an apparatus for controlling the clutches in an automatic transmission on a vehicle that allows for elimination of the valve body and its associated components.

A further aspect of the invention provides an apparatus for controlling the clutches in an automatic transmission on a vehicle that allows for elimination of the high-pressure pump.

Another aspect of the present invention provides an apparatus for controlling a clutch in an automatic transmission on a vehicle. The apparatus comprises an electric motor affixed to a housing of the transmission, and having a motor shaft with a driving element rotatably attached to it. The apparatus further comprises a torque-to-thrust mechanism driven by the driving element and includes a thrust element for imparting a linear force to apply the clutch. The apparatus also includes a sensing system configured to output at least one electronic signal related to the magnitude of the linear force, and a transmission control module that receives the at least one electronic signal from the sensing system and controls the electric motor.

It is another aspect of the present invention to provide an apparatus for controlling clutches in an automatic transmission on a vehicle. The apparatus comprises a plurality of electric motors fixedly attached to a housing of the transmission, each motor having a motor shaft with a driving element rotatably attached to it. The apparatus further comprises a plurality of torque-to-thrust mechanisms, each driven by a corresponding driving element, and each including a thrust element for imparting a linear force to a corresponding clutch. The apparatus also includes a plurality of sensing systems, each configured to output at least one electronic signal that is related to the magnitude of the linear force on a corresponding clutch. A transmission control module receives the electronic signals from the sensing systems and controls the electric motors.

Yet another aspect of the present invention provides a vehicle having an automatic transmission including an apparatus for controlling at least some of the clutches in the transmission, thereby reducing both the vehicle space required by the transmission and the power consumed by the transmission. The apparatus comprises a plurality of electric motors fixedly attached to a housing of the transmission, each motor having a motor shaft with a driving element rotatably attached to it. The apparatus further comprises a plurality of torque-to-thrust mechanisms, each driven by a corresponding driving element, and each including a thrust element for imparting a linear force to a corresponding clutch. The apparatus also includes a plurality of sensing systems, each configured to output at least one electronic signal that is related to the magnitude of the linear force on a corresponding clutch. A transmission control module receives the electronic signals from the sensing systems and controls the electric motors.

The above objects and other objects, features and advantages of the present invention are readily apparent from the following detailed description of the best modes for carrying out the invention when taken in connection with the accompanying drawings.

DESCRIPTION OF THE PREFERRED EMBODIMENT

Figure 1:
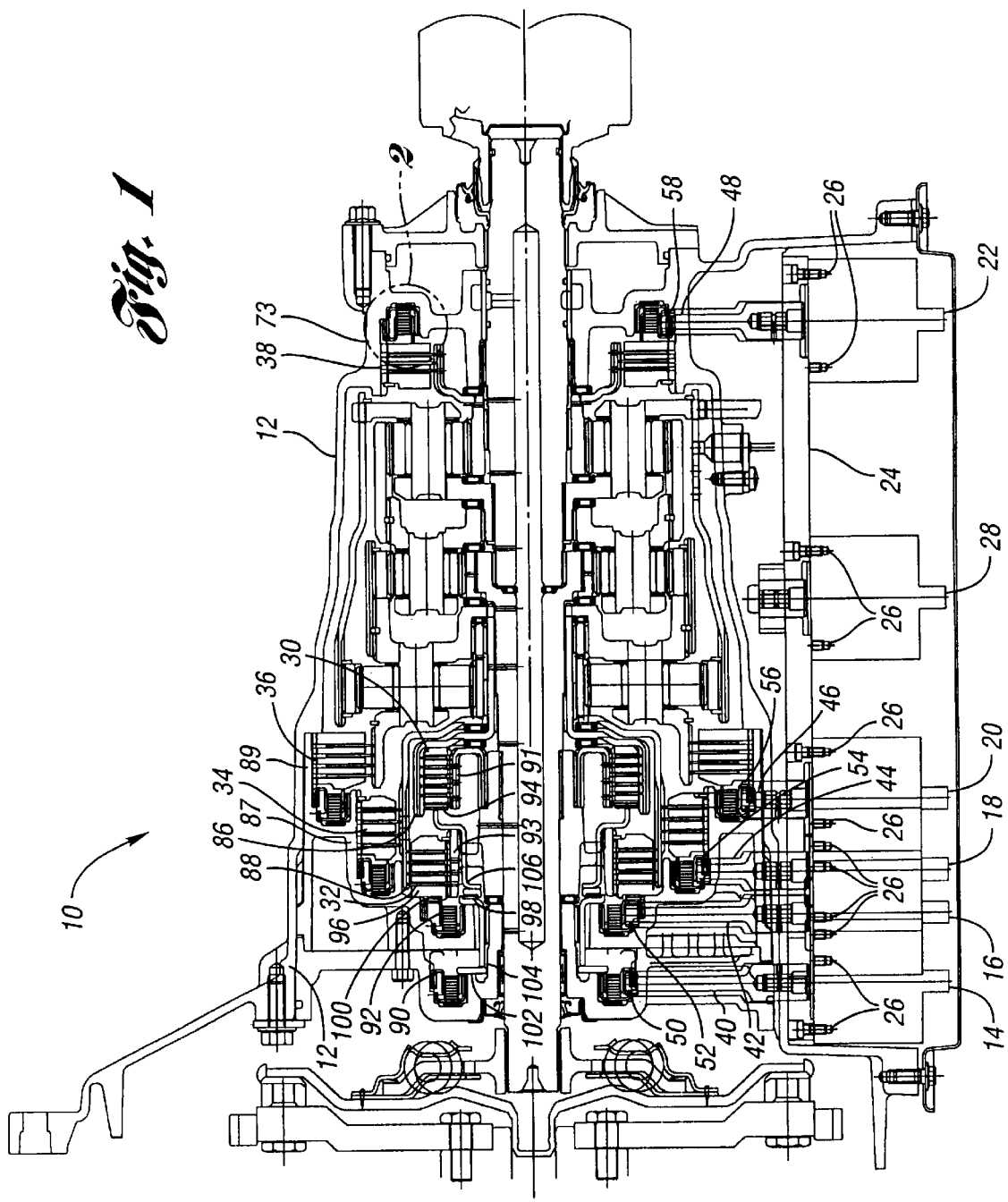
FIG. 1 is a side sectional view of an automatic vehicle transmission with five electric drive motors and one electric pump motor mounted on the bottom of the transmission housing.

FIG. 1 shows a side sectional view of an automatic vehicle transmission 10 that includes a transmission housing 12, commonly referred to as the transmission case. Electric drive motors 14, 16, 18, 20 and 22 are attached to the bottom portion 24 of the transmission case 12 with threaded fasteners 26. Electric pump motor 28 is also attached to the bottom portion 24 of the transmission case 12 with threaded fasteners 26. The drive motors 14, 16, 18, 20 and 22 control clutches 30, 32, 34, 36 and 38, respectively. Attached to the drive motors 14, 16, 18, 20 and 22 are motor shafts 40, 42, 44, 46 and 48, respectively. Attached to the end of each of the motor shafts 40, 42, 44, 46 and 48 are spur gears 50, 52, 54, 56 and 58, respectively. The spur gears 50, 52, 54, 56 and 58 shown here are merely one type of drive element. Other types of drive elements include worm and bevel gears, and sprockets, which are used in conjunction with chains to transmit the rotation of the electric motor shaft.

Figure 2:
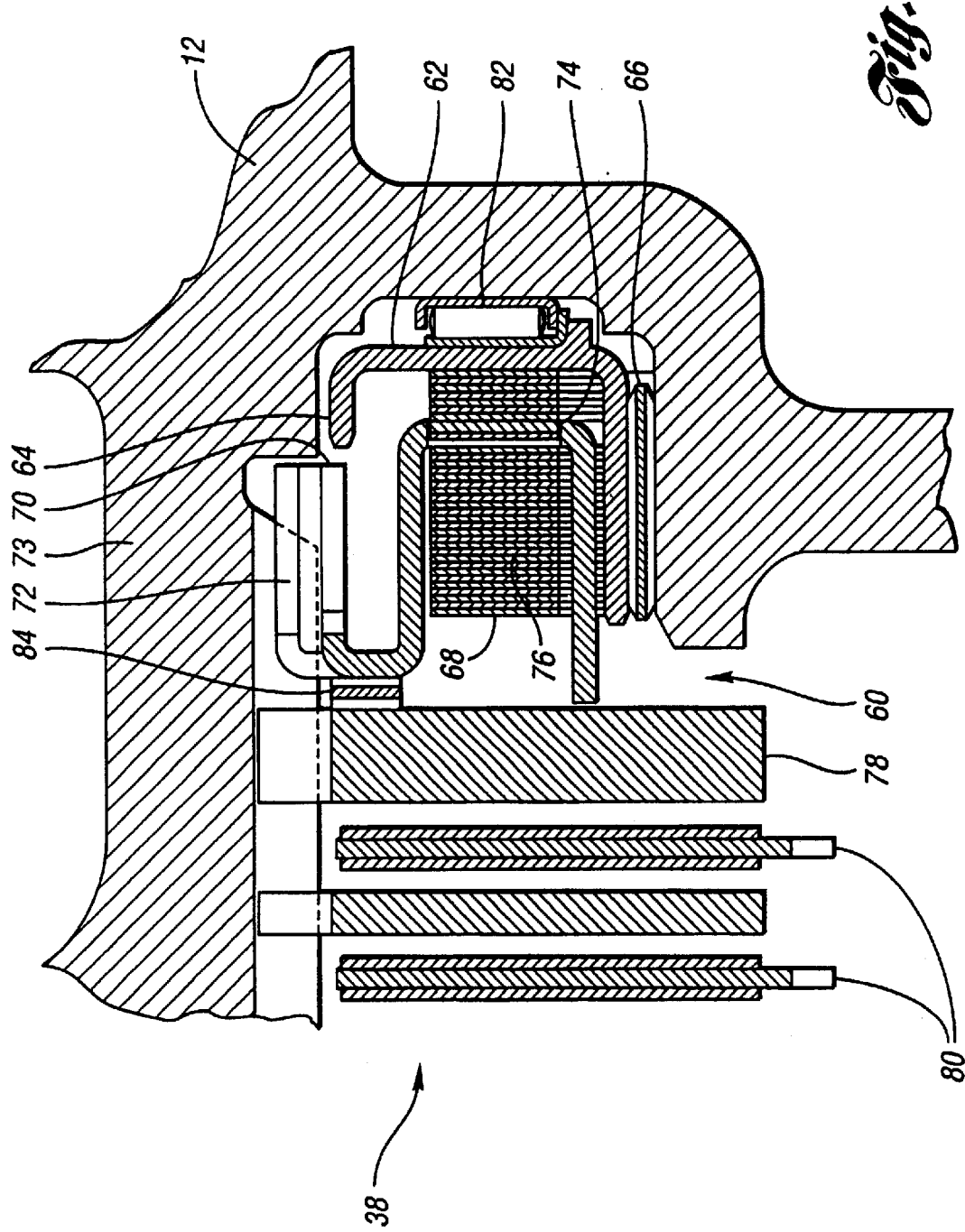
FIG. 2 is a fragmentary sectional view of detail 2 shown in FIG. 1.

Circle 2 is shown in detail in the fragmentary sectional view seen in FIG. 2. A torque-to-thrust mechanism 60 is used to transform the torque of the drive motor 22 into a linear thrust force to engage the clutch 38. The torque-to-thrust mechanism 60, described here in detail, is just one of a number of such mechanisms that can be used in the present invention. A drive wheel 62 includes a plurality of teeth 64 which intermesh with the teeth on the spur gear 58. In other embodiments, the drive wheel 62 can be configured with sprocket teeth to accommodate a chain. Such a configuration is contemplated when the drive element attached to the electric motor shaft is a sprocket, and the rotation of the motor shaft is transmitted to the drive wheel through the chain. Returning to FIG. 2, the drive wheel 62 is piloted on a bushing 66 which carries a small radial load imparted by the drive wheel 62 to the transmission case 12. One end of a coil spring 68 is attached to the drive wheel 62 such that rotation of the drive wheel 62 causes rotation of the coil spring 68 about the center line of the transmission. The coil spring 68 comprises a rectangular steel ribbon which makes it well suited for use in the torque-to-thrust mechanism 60.

An apply ring thrust element 70 is rotationally constrained by spline 72 in a housing 73 that is part of the transmission case 12. The apply ring 70 includes an aperture 74 through which the coils 76 of the coil spring 68 are threaded. As the drive motor 22 causes rotation of the drive wheel 62 and the coil spring 68, the coils 76 are fed through the aperture 74 because of the rotational constraint on the apply ring 70. As the coils 76 feed through the aperture 74, the number of coils 76 on one side of the apply ring 70 increases, while the number of coils 76 on the other side of the apply ring 70 decreases. This causes the apply ring 70 to move linearly toward the side with the decreasing number of coils. To engage the clutch 38, the drive motor 22 rotates the drive wheel 62 and the coil spring 68 such that the apply ring 70 moves toward the apply plate 78. Continued rotation of the drive motor 22 in this direction causes the apply ring 70 to contact the apply plate 78 with enough thrust that disks 80 within the clutch 38 are engaged.

The thrust generated by the apply ring 70 is dependent on the torque produced by the drive motor 22. Once the motor torque has produced sufficient thrust, and therefore sufficient clutch capacity, no further power needs to be provided to the drive motor 22 to maintain this capacity. This is because the reaction force on the apply ring 70, which opposes the thrust force, is not sufficient to thread the coils 76 back through the aperture 74. In other embodiments, where different torque-to-thrust mechanisms are employed—i.e., ones that do not maintain clutch capacity—the drive motor can be configured with a device to perform this function. For example, the drive motor can include a friction device such as a disk clutch, or a selective one-way clutch such as a roller clutch or mechanical diode. Configuring the motor with one of these devices will ensure that clutch capacity is maintained in the absence of power at the motor. Because the reaction force experienced by the apply ring 70 is in a direction opposite from its movement, it is necessary to provide a bearing 82 between the drive wheel 62 and the transmission case 12. Because the force required to engage the disks 80 in the clutch 38 is relatively high, the bearing 82 must be able to carry a heavy load. A needle thrust bearing is well suited to this application. When the drive motor 22 rotates in the opposite direction, the apply ring 70 moves away from the apply plate 78, thereby disengaging the disks 80 within the clutch 38.

In order for the vehicle occupants to experience a smooth comfortable ride, it is necessary for the apply ring 70 to apply the linear thrust force to the apply plate 78 in a smooth continuous fashion at a controlled level and over a controlled length of time. Because the movement of the apply ring 70 is dependent upon the rotation of the coil spring 68 and the drive wheel 62, and the rotation of these elements is dependent upon the rotation of the drive motor 22, it is ultimately necessary to control the rotation of the drive motor 22 in order to ensure smooth engagement of the clutch 38. Proper control of the drive motor 22 requires a knowledge of the relationship between the motor torque and the linear thrust force of the apply ring 70. The torque of the spur gear 58 equals the torque of the drive motor 22. The torque on the drive wheel 62 and therefore the coil spring 68 is proportional to the torque of the spur gear 58. The thrust of the apply ring 70 is proportional to the torque on the coil spring 68. The thrust of the apply ring 70 is the clamp force on the clutch 38, which is proportional to the torque capacity of the clutch. Therefore, a proportional relationship exists between the torque of the drive motor 22 and the torque capacity of the clutch.

Smooth engagement of the clutch 38 requires that small rotations of the drive motor 22 result in only small increases in the force imparted to the apply plate 78. In other words, there must be enough compliance in the torque-to-thrust mechanism 60 to ensure that small changes in the rotation of the drive motor 22 do not result in large changes in the force imparted to the apply plate 78. This would result in a loss of sensitivity and an inability to smoothly engage the clutch 38. Therefore, a spring 84 is added to the torque-to-thrust mechanism 60 to increase the overall mechanism compliance. As shown in FIG. 2, the spring 84 is located between the apply plate 78 and the apply ring 70. It is worth noting that the spring 84 can be effectively used in other locations within the torque-to-thrust mechanism 60.

Controlling the smooth engagement of the clutch 38 is accomplished by controlling the rotation of the motor 22, which in turn can be accomplished by monitoring its current load and rotational position with a sensing system. The information gathered by the sensing system is incorporated into a feedback loop that allows for adjustment of the drive motor 22. In this embodiment, the sensing system includes a small ammeter (not shown) that is placed in any convenient location in or around the transmission 10. The ammeter monitors the current load on the drive motor 22 and sends this information to a transmission control module (not shown). The sensing system also includes an encoder, located within the housing of the motor 22, that monitors the rotational position of the motor and sends this information to the transmission control module.

Transmission control modules, or TCMs, are currently used on virtually all automatic transmissions made today. In an automatic transmission of standard design, the TCM monitors certain inputs such as engine speed, road speed and engine load so that gears are properly selected and the shifting operation is smooth. Receiving these various inputs, the TCM then outputs control signals to the solenoids within the valve body. Actuating the solenoids engages the clutches, which is the standard method used in an automatic transmission.

In the present invention, the TCM will have at least two additional inputs—i.e., the current load on the drive motor 22 as measured by the ammeter, and the rotational position of the motor 22 as measured by the encoder. When the apply ring 70 is not contacting the apply plate 78, the current load on the motor 22 is minimal. As the apply ring 70 contacts the apply plate 78, the ammeter detects an increase in the current load resulting from an increase in motor torque. Now, controlling the position of the motor controls the motor torque and the resulting application of the clutch 38. Motor control is accomplished by the TCM which receives motor position information from the encoder, and makes requisite adjustments to the motor position to facilitate smooth application of the clutch 38. In another embodiment, a position spring is used to determine the thrust on the apply plate. Because the stiffness of the spring is known, a knowledge of its deflection, which is determined by its position, allows the TCM to determine the thrust force on the apply plate and make adjustments to the motor as needed.

The TCM used in the present invention is a modified version of the TCMs used in transmissions of standard design. First, the TCM must be able to receive signals from the sensing system, which can include an ammeter and encoder, as well as other sensing devices. In addition, the present invention replaces the hydraulic systems typically used to apply clutches. Thus, the valve body and its associated components are eliminated, and the TCM will not need to control the solenoids found within a typical valve body. Finally, control of the drive motor 22 will significantly increase the current load on the TCM, necessitating a modification to handle this increased load.

The torque-to-thrust mechanism 60 detailed in FIG. 2 is the same for each of the five clutches 30, 32, 34, 36 and 38, with one exception. The clutches 30, 32 have rotating housings 86, 88. This is in contrast to the clutches 34, 36, 38 which have stationary housings 87, 89, 73 that are attached to, or are part of, the transmission case 12. In order for a torque-to-thrust mechanism such as the one shown in FIG. 2 to function properly, the motor and the apply ring must be rotationally constrained. Therefore, in clutches such as 30, 32 shown in FIG. 1, which have both rotating hubs 91, 93 and rotating housings 86, 88, a system is needed that allows relative rotational motion between apply rings 90, 92 and apply plates 94, 96. To allow for this relative motion, bearings 98, 100 are added to the torque-to-thrust mechanisms of these clutches. Thus, the apply ring 90 imparts a linear force to the bearing 98 through link elements 102, 104. This force is then transmitted to a second apply ring 106, which transfers the force to the apply plate 94 of the clutch 30. The apply ring 90 remains rotationally constrained while the hub 91 and housing 86 rotate around the center line of the transmission. Similarly, the apply ring 92 imparts a force to the apply plate 96 of the clutch 32 through the bearing 100. This allows the apply ring 92 to remain rotationally constrained while the hub 93 and housing 88 of the clutch 32 rotate around the center line of the transmission.

One of the purposes of the high-pressure pump in an automatic vehicle transmission is to pump the transmission fluid to the valve body where it is regulated and directed by solenoids. The solenoids control the flow of the fluid through valves, which allows for selective hydraulic engagement of the clutches. Use of the present invention eliminates the need for the high-pressure pump to perform this function. However, another function of the high-pressure pump is to supply fluid to the torque converter. Therefore, it is possible to eliminate the high-pressure pump only if the torque converter is also eliminated. One of the functions of the torque converter is to allow a vehicle in gear to have the engine continue to rotate while the transmission output shaft is held stationary. To eliminate the torque converter, it is necessary to supply a transmission with a clutch that allows for controlled slip. The low/reverse clutch 36, shown in FIG. 2, performs this function. By using the clutch 36, which eliminates the need for a torque converter by providing a controlled slip, in conjunction with the present invention, which eliminates the need for the valve body and its components, the high-pressure pump can be eliminated. This results in an overall cost savings and an increase in vehicle efficiency.

It is important to note, however, that transmission oil must still be distributed throughout the transmission so that the moving parts are cooled and lubricated. In the present invention, the pump motor 28 shown in FIG. 1 handles this function. The pump motor 28 can be a fixed displacement type pump, and will typically operate at a pressure of no more than 20 psi. This is significantly lower than the pressure generated by the high-pressure pump, which often operates in a 60–300 psi range. This means that the pump motor 28 is small enough to be mounted adjacent to the drive motors 14, 16, 18, 20 and 22. The pump motor 28, like the drive motors 14, 16, 18, 20 and 22, is controlled by the TCM. In addition to the pressure reduction from the standard hydraulic system found in most automatic transmissions, the quantity of fluid pumped by the pump motor 28 is also significantly less. This is because the sole purpose of the fluid used in the present invention is to cool and lubricate the working parts. Large quantities of high pressure hydraulic fluid are no longer necessary to actuate the hydraulic systems found in most automatic transmissions.

Figure 3:
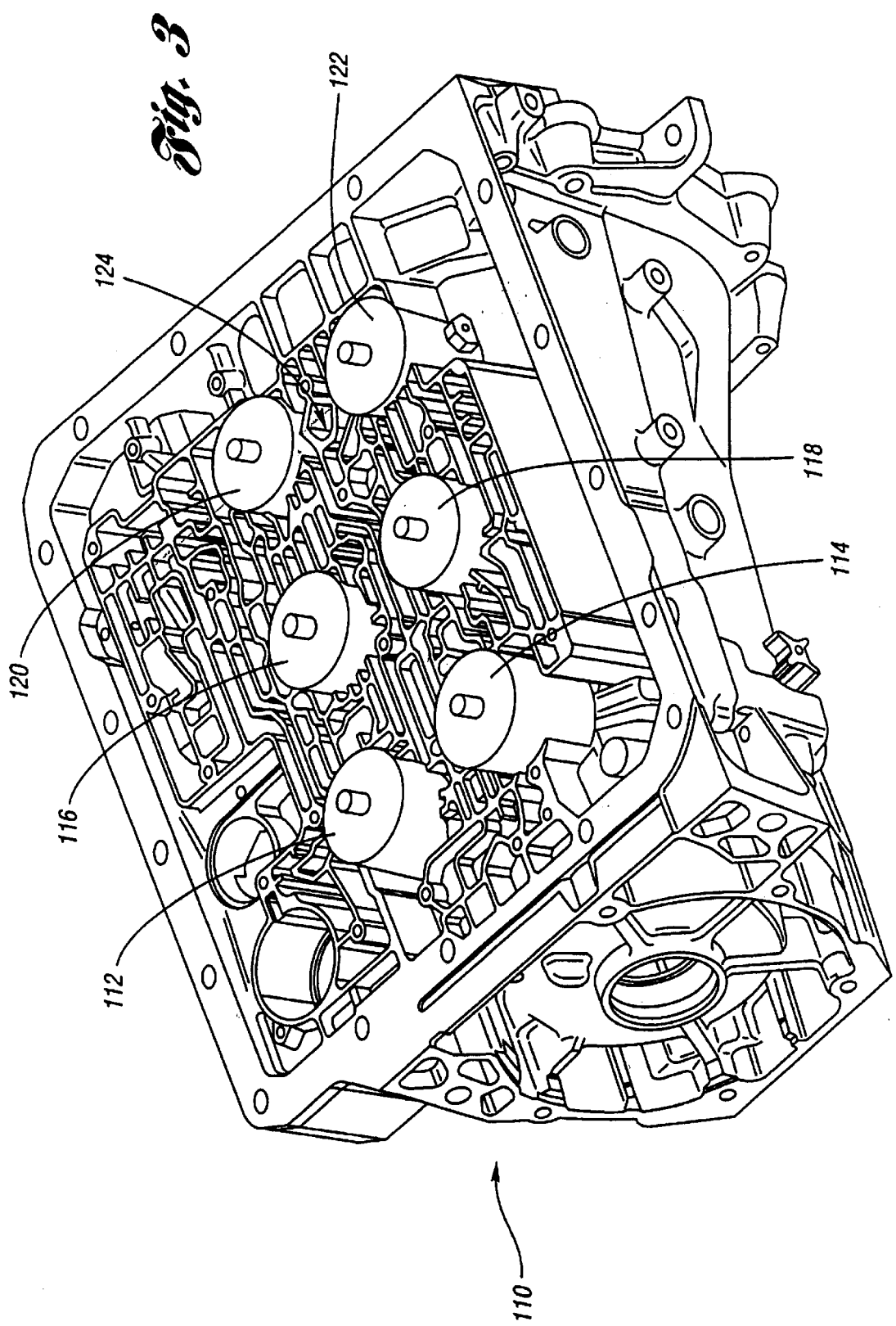
FIG. 3 is a perspective view of the underside of an automatic transmission housing with five clutch motors and one oil pump motor attached.

FIG. 3 shows the underside of an automatic transmission housing 110 having five clutch motors 112, 114, 116, 118, 120, and a pump motor 122, mounted thereon. All six motors are small enough to be neatly packaged on the bottom of the housing 110. In addition, transmission oil routing channels 124, which are included here for illustrative purposes only, are also unnecessary with the present invention. It is through these channels that the high pressure transmission fluid is routed in a typical automatic transmission. Because only a small amount of low pressure lubrication oil used in the present invention, there is no need for the elaborate system of channels 124 shown in FIG. 3. Thus, another benefit of the invention is that the transmission housing is less complex and therefore less costly.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for controlling at least one clutch in an automatic transmission on a vehicle, comprising:
   an electric motor fixedly attached to a housing of the transmission, and having a motor shaft;
   a driving element rotatably attached to the motor shaft;
   a torque-to-thrust mechanism driven by the driving element, having a thrust element for imparting a linear force to apply the at least one clutch;
   a pump motor fixedly attached to the transmission housing for pumping fluid throughout the transmission to cool and lubricate the transmission components;
   a sensing system configured to output at least one electronic signal related to the magnitude of the linear force; and
   a transmission control module for receiving the at least one electronic signal from the sensing system and controlling the electric motor.

2. The apparatus of claim 1, wherein the motor is fixedly attached to the housing off the transmission centerline.

3. The apparatus of claim 1, wherein the torque-to-thrust mechanism maintains clutch capacity with no power supplied to the motor.

4. The apparatus of claim 1, wherein the electric motor comprises a friction element configured to maintain clutch capacity with no power supplied to the motor.

5. The apparatus of claim 1, wherein the electric motor comprises a selective one-way clutch that maintains clutch capacity with no power supplied to the motor.

6. The apparatus of claim 1, wherein the sensing system comprises an ammeter configured to measure the current load on the motor and output a signal to the transmission control module, and an encoder configured to measure the rotational position of the motor and output a signal to the transmission control module.

7. The apparatus of claim 1, wherein said at least one clutch includes a plurality of clutches, and wherein the apparatus further comprises a plurality of electric motors each having a motor shaft with a driving element rotatably mounted to a corresponding motor shaft, and a plurality of torque-to-thrust mechanisms, each driven by a corresponding driving element and each including a thrust element for imparting a linear force to apply a corresponding clutch.

8. The apparatus of claim 7, wherein at least one of the torque-to-thrust mechanisms further comprises a bearing for facilitating application of the linear force to a clutch having a rotating hub and a rotating housing.

9. An apparatus for controlling clutches in an automatic transmission on a vehicle, comprising:
   a plurality of electric motors fixedly attached to a housing of the transmission, each motor having a motor shaft;
   a plurality of driving elements rotatably attached to a corresponding motor shaft;
   a plurality of torque-to-thrust mechanisms, each driven by a corresponding driving element and each including a thrust element for imparting a linear force to apply a corresponding clutch; and
   wherein at least one of the plurality of torque-to-thrust mechanisms is sufficiently continued to maintain the linear force on the corresponding clutch with no power supplied to the corresponding motor.

10. The apparatus of claim 9, wherein the motors are fixedly attached to the transmission housing off the transmission centerline.

11. The apparatus of claim 9, wherein at least one of the torque-to-thrust mechanisms further includes a rotatable drive wheel on operatively connected to the corresponding drive element, and a coil spring operatively connected to the drive wheel at one end of the spring; wherein the thrust element defines an aperture through which the coil spring extends; and wherein rotation of the drive wheel causes movement of the coil spring through the aperture to cause movement of the thrust element to apply the linear force.

12. The apparatus of claim 9, wherein at least one of the torque-to-thrust mechanisms further comprises a bearing for facilitating application of the linear force to a clutch having a rotating hub and a rotating housing.

13. The apparatus of claim 9, further comprising a plurality of sensing systems and a transmission control module for controlling the electric motors; wherein each sensing system comprises an ammeter configured to measure the current load on a corresponding motor and output a signal to the transmission control module, and an encoder configured to measure the rotational position of the corresponding motor and output a signal to the transmission control module.

14. An automatic transmission for a vehicle, the automatic transmission comprising:
  a plurality of clutches;
  a plurality of electric motors fixedly attached to a housing of the transmission, each motor having a motor shaft;
  a plurality of driving elements rotatably attached to a corresponding motor shaft;
  a plurality of torque-to-thrust mechanisms, each driven by a corresponding driving element and each including a thrust element for imparting a linear force to apply one of the plurality of clutches; and
  wherein one of plurality of clutches is configured to allow for controlled slip.

15. The automatic transmission of claim 14, wherein the automatic transmission is characterized by the absence of a torque converter.

16. The automatic transmission of claim 15, further comprising a pump motor fixedly attached to a housing for the transmission for pumping fluid throughout the transmission to cool and lubricate the transmission components.

* * * * *